United States Patent [19]

Mazanec et al.

[11] Patent Number: 4,666,944
[45] Date of Patent: May 19, 1987

[54] COPPER-ZIRCONIUM-MANGANESE-CONTAINING CATALYSTS AND PROCESSES FOR MAKING ALCOHOL MIXTURES USING SAME

[75] Inventors: Terry J. Mazanec; John G. Frye, Jr., both of Solon, Ohio

[73] Assignee: The Standard Oil Company, Cleveland, Ohio

[21] Appl. No.: 772,604

[22] Filed: Sep. 4, 1985

Related U.S. Application Data

[62] Division of Ser. No. 653,946, Sep. 21, 1984, Pat. No. 4,559,316.

[51] Int. Cl.⁴ .............................................. G07C 27/06
[52] U.S. Cl. .................................... 518/700; 518/713
[58] Field of Search ............................... 518/700, 713

[56] References Cited

U.S. PATENT DOCUMENTS

| | | | |
|---|---|---|---|
| 1,741,308 | 12/1933 | Jaeger . | |
| 1,859,244 | 5/1932 | Patant | 518/713 |
| 2,061,470 | 11/1936 | Larson | 518/713 |
| 2,787,628 | 4/1957 | Himmler et al. | 260/449 |
| 4,298,354 | 11/1981 | Hardman et al. | 518/713 |
| 4,377,643 | 12/1981 | Pesa et al. | 518/713 |
| 4,440,668 | 4/1984 | Chang et al. | 518/713 |
| 4,478,955 | 12/1981 | Pesa et al. | 518/713 |
| 4,483,943 | 11/1984 | Windaur et al. | 518/713 |
| 4,540,713 | 9/1985 | Hardman et al. | 518/713 |

FOREIGN PATENT DOCUMENTS

| | | |
|---|---|---|
| 608361 | 1/1936 | Fed. Rep. of Germany . |
| 625757 | 1/1936 | Fed. Rep. of Germany . |
| 2523992 | 7/1976 | Fed. Rep. of Germany . |
| 229715 | 2/1925 | United Kingdom . |
| 707972 | 11/1954 | United Kingdom . |

OTHER PUBLICATIONS

Smith et al., Canadian J. of Chemical Engineering, vol. 61, Feb. 1983 pp. 40–45.
Frolich, P. K. and Cryder, D. S., Ind. Eng. Chem., 1930, 22, 1051–1057.
Graves, G. D., Ind. Eng. Chem. 1931, 23, 1381–1385.
Morgan, G. T., Hardy, D. V. N., and Procter, R. H., J. Soc. Chem. Ind. Trans. Comm., 1932, 51, 1T–7T.
Negishi, R.; Rev. Phys. Chem. Japan, 15, 171–181 (1941).
Cohn, E. M.; "Catalysis", (Emmett, P. H., Ed.), vol. IV, pp. 443–472, Reinhold, NY (1956).
Natta, G. et al; "Catalysis", (Emmett, P. H., Ed.), vol. V, p. 131–174, Reinhold, N.Y. (1957).
Philip, B. H. et al; Tetr. Lett., 15, 523–526 (1961).
Lundeen, A. J. et al; J. Org. Chem., 32, 3386–3389 (1967).
Davis, B. H. et al; J. Catal., 25, 81–92 (1972).
Canesson, P. et al; J. Catal., 42, 205–212 (1976).
Yamaguchi, T. et al; Chem. Lett., 677–678 (1976).
Manriquez, J. M. et al; J. Amer. Chem. Soc., 100, 7112–7114 (1978).
Sapienza, R. S. et al; "Fundamental Research in Homogeneous Catalysis", (M. Tsutsui, Ed.), vol. 3, pp. 179–197, Plenum Prss, NY (1978).
Vedage, G. A., Himelfarb, P., Simmons W. G., and Klier, K., "Alkali Promoted Cu/ZnO Catalysts for Low Alcohol Synthesis", Prepr. Petr. Div. ACS., Aug., 1983, Wash., D.C., pp. 1261–1271.

Primary Examiner—Howard T. Mars
Attorney, Agent, or Firm—Larry W. Evans; David J. Untener; Raymond F. Keller

[57] ABSTRACT

A catalylst is disclosed which has the formula

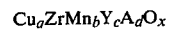

$$Cu_a Zr Mn_b Y_c A_d O_x$$

wherein
Y is selected from the group consisting of Al, Zn, Ce, Cr, Co, Pd, Pt, Rh, Ag, Ru, Re, Os, Ta, Nb or a mixture of two or more thereof,
A is an alkali or alkaline earth metal or a mixture of alkali and/or alkaline earth metals,
a is from about 0.1 to about 3,
b is from about 0.01 to about 3,
c is from 0 to about 3,
d is from about 0.02 to about 2.5, and
x is the number of oxygens needed to fulfill the valence requirements of the other elements. A process for making alcohol mixtures is also disclosed which comprises contacting a gaseous reactant containing hydrogen and carbon monoxide (e.g., synthesis gas) with the foregoing catalyst.

18 Claims, No Drawings

COPPER-ZIRCONIUM-MANGANESE-CONTAINING CATALYSTS AND PROCESSES FOR MAKING ALCOHOL MIXTURES USING SAME

This is a division of application Ser. No. 653,946, filed Sept. 21, 1984, now U.S. Pat. No. 4,559,316.

TECHNICAL FIELD

This invention relates to catalysts and to processes for making alcohol mixtures using such catalysts. More particularly, this invention relates to copper-zirconium-manganese-containing catalytic complexes and to processes using such catalytic complexes for converting gaseous mixtures of hydrogen and carbon monoxide, particularly synthesis gas, to alcohol mixtures.

BACKGROUND OF THE INVENTION

Synthesis gas may be defined as any of several gaseous mixtures used for synthesizing a wide range of compounds, both organic and inorganic. Such mixtures result from reacting carbon-rich substances with steam (steam reforming) or steam and oxygen (partial oxidation). These mixtures contain chiefly carbon monoxide and hydrogen, and usually low percentages of carbon dioxide and nitrogen (less than 2%). The organic source materials may be natural gas, methane, naphtha, heavy petroleum oils or coke. The reactions are usually nickel-catalyzed steam-cracking (reforming) of methane or natural gas ($CH_4 + H_2O \rightarrow CO + 3H_2$); partial oxidation of methane, naphtha, or heavy oils; and (especially in view of the petroleum shortage) the water-gas reaction with coke ($C + H_2O \rightarrow CO + H_2$).

It is known to use transition-metal catalysts to convert synthesis gas to alcohols, aldehydes, acetic acid, etc. A continuing problem exists, however, in finding suitable catalysts for selectively converting synthesis gas to alcohol mixtures.

U.S. Pat. No. 2,061,470 discloses the production of methanol and other carbon compounds by contacting a gaseous mixture containing carbon monoxide and hydrogen under pressure with a catalyst consisting of the reduction product of a fused mixture of copper oxide and manganese oxide, or copper oxide and zinc oxide, and an oxide of an element selected from the group consisting of chromium, vanadium, zirconium, aluminum, magnesium, titanium, thorium, silicon and cerium.

U.S. Pat. No. 4,298,354 discloses an oxide-complex catalyst containing copper, thorium, an alkali metal and at least one other metal selected from the group consisting of Ca, Mo, Rh, Mn, Pt, Ce, Cr, Zn, Al, Ti, La, V, U, Ru, Re and Pd. These catalysts are useful in converting synthesis gas to alcohols, such alcohols containing from 2 to 6 carbon atoms and normally not more than 85% methanol by weight.

U.S. Pat. No. 4,377,643 discloses the production of alkanes and oxygenated hydrocarbons, particularly alcohols, from synthesis gas using a catalytic complex containing ruthenium, copper, an alkali metal and a promoter selected from the group consisting of Rh, Ir, Pd and Pt.

There is a continuing need for a suitable catalytic complex for converting mixtures of hydrogen and carbon monoxide, particularly synthesis gas, to alcohol mixtures.

SUMMARY OF THE INVENTION

The present invention contemplates the provision of copper-zirconium-manganese-containing catalytic complexes and processes using such catalytic complexes for converting gaseous mixtures of hydrogen and carbon monoxide, particularly synthesis gas, to alcohol mixtures.

Broadly stated, the present invention provides for a catalytic complex of the formula $$Cu_aZrMn_bY_cA_dO_x$$

wherein
Y is selected from the group consisting of Al, Zn, Ce, Cr, Co, Pd, Pt, Rh, Ag, Ru, Re, Os, Ta, Nb or a mixture of two or more thereof,
A is an alkali or alkaline earth metal or a mixture of alkali and/or alkaline earth metals,
a is from about 0.1 to about 3,
b is from about 0.01 to about 3,
c is from 0 to about 3,
d is from about 0.02 to about 2.5, and
x is the number of oxygens needed to fulfill the valence requirements of the other elements.

The present invention further provides for a process for producing a product comprising an alcohol mixture, said process comprising contacting a gaseous reactant containing carbon monoxide and hydrogen with a catalytic complex of the formula $$Cu_aZrMn_bY_cA_dO_x$$

wherein
Y is selected from the group consisting of Al, Zn, Ce, Cr, Co, Pd, Pt, Rh, Ag, Ru, Re, Os, Ta, Nb or a mixture of two or more thereof,
A is an alkali or alkaline earth metal or a mixture of alkali and/or alkaline earth metals,
a is from about 0.1 to about 3,
b is from about 0.01 to about 3,
c is from 0 to about 3,
d is from about 0.02 to about 2.5, and
x is the number of oxygens needed to fulfill the valence requirements of the other elements.

DESCRIPTION OF THE PREFERRED EMBODIMENTS

Catalyst

The novel catalysts provided in accordance with the present invention are constituted of a catalytic complex of the formula $$Cu_aZrMn_bY_cA_dO_x$$

wherein
Y is selected from the group consisting of Al, Zn, Ce, Cr, Co, Pd, Pt, Rh, Ag, Ru, Re, Os, Ta, Nb or a mixture of two or more thereof;
A is an alkali or alkaline earth metal or a mixture of alkali and/or alkaline earth metals;
a is from about 0.1 to about 3, preferably about 0.3 to about 1.5;
b is from about 0.01 to about 3, preferably about 0.2 to about 1;
c is from 0 to about 3, preferably about 0.01 to about 0.5;

d is from about 0.02 to about 2.5, preferably about 0. to about 1; and x is the number of oxygens needed to fulfill the valence requirements of the other elements.

A can be selected from the group consisting of Na, Li, K, Rb, Cs, Be, Mg, Ca, Sr, Ba and mixtures of two or more thereof. A is preferably Na, Li, K, Rb, Cs, Mg or a mixture of two or more thereof.

Y is preferably Al, Ce, Zn, Pd, Pt or Cr or a mixture of two or more thereof.

The catalyst of the present invention is a mixed-metal oxide. In the process of the invention, this catalyst is preferably utilized in a partially reduced state. However, this catalyst is generally not totally reduced to elemental metal and thus retains an oxide character.

These catalysts may be prepared by conventional procedures known to those skilled in the art. Typically these procedures involve first mixing compounds containing the catalytic components in a liquid solution or slurry, (e.g., a water solution or slurry), and heating. The catalyst precursor is recovered from the liquid then dried and calcined. Suitable compounds containing the catalytic components include but are not limited to oxides, hydroxides, inorganic salts (e.g., nitrates, phosphates, halides, carbonates, silicates, aluminates) and salts of organic acids (e.g., acetates, formates, butyrates, propionates, benzoates and the like).

Preferred catalysts of the invention are prepared by recovering the catalyst precursor by adding to the aqueous solution of zirconium, copper and manganese and "Y" metal (if any) components, an alkali metal hydroxide or carbonate to cause precipitation of the catalyst precursor, heating in the presence of the alkali metal, and thereafter filtering, washing, drying and calcining the precipitate.

These catalysts may be formed in any conventional manner, such as tabletting, pelleting, or supporting the active catalyst material on a carrier. The carrier is preferably inert and may include silica, alumina, Alundum, clay, alumina-silica, silicon carbide, zeolite, and the like.

A particularly useful coating procedure is disclosed in U.S. Pat. No. 4,077,912, which is incorporated herein by reference. Briefly, this method involves partially wetting the carrier, contacting the partially wetted carrier with a powdered precipitate of the catalytic components, then gently agitating the mixture until the catalytic complex is formed. Agitation is conveniently conducted by placing the partially wetted carrier in a rotating drum and adding the powdered precipitate until none is taken up by the carrier. The liquid used to wet the carrier may include inorganic or organic liquids and is dependent upon the type of catalytic components employed. The liquid and the catalytic components should have a relatively high degree of attraction for each other.

The catalytic components can also be impregnated on the carrier by depositing a solution containing the catalytic components on the carrier using known techniques, then drying and calcining.

The catalytic components may optionally be individually coated or impregnated on a carrier using the above-indicated techniques.

Reactants

The material being reacted in accordance with the present invention to form the alcohol mixture is a gaseous mixture of hydrogen and carbon monoxide. It is preferably synthesis gas. As is well known, synthesis gas is composed basically of a mixture of hydrogen and carbon monoxide in which the $H_2/CO$ ratio is from about 1:10 to about 10:1, preferably from about 1:3 to about 3:1. It is normally derived by heating coke in the presence of air and then steam. Alternately, it can also be produced by partial combustion of coal, natural gas or petroleum hydrocarbons. It is sometimes referred to as "water gas". Synthesis gas normally contains a very low amount of sulfur compounds. It also may contain small amounts of carbon dioxide, nitrogen and other inerts.

Although synthesis gas is a preferred reactant, any other gas composed primarily of hydrogen and carbon monoxide and having an $H_2$ to CO ratio of about 1:10 to about 10:1, preferably about 1:3 to about 3:1, can be employed. The gaseous reactant should contain as little sulfur compounds as possible since sulfur is a known poison for copper containing catalysts. Preferably the gaseous reactant is essentially sulfur-free.

Reaction Mode and Conditions

The inventive process is carried out by contacting the gaseous reactant with the inventive catalyst as described below in a suitable reactor. The reaction can be carried out in any suitable reactor configuration such as fluid bed, fixed bed or slurry reactor, continuously or in batch mode.

The contact time of the reactants with the catalyst is not critical but should be below about 200 seconds and preferably between about 5 and 100 seconds.

The reaction pressure should normally be in the range of about 150 to about 4000 psig, preferably about 750 to about 1000 psig. Although there is no real upper limit to the reaction pressure, pressures higher than about 1500 psig or 2000 psig are normally not employed because of the high expense involved. It is preferable to operate at at least about 500 psig because formation of alcohols is favored at high pressures.

The reaction temperature should be maintained in the range of about 100° to about 500° C., preferably about 220° to about 400° C., and more preferably about 250° to about 325° C.

An advantage of the process of this invention is that the temperatures and pressures employed are quite a bit lower than temperatures and pressures necessary in most prior art processes for producing alcohol mixtures from synthesis gas.

The space velocity of the gaseous reactant is not critical but should be about 1000 to about 100,000, preferably about 2000 to about 20,000 liters of gaseous reactant per liter of catalyst per hour.

Product

The products produced in accordance with the process of the present invention are predominantly alcohol mixtures containing a major amount of methanol and significant amounts of higher alcohols usually having 2 to about 8, preferably 2 to about 6 carbon atoms. Normally, the alcohol products of the present invention contain about 40% to about 85% methanol, although higher amounts of methanol may be included in the product if reaction temperature is too low or if the catalyst contains additional elements fostering the generation of higher amounts of methanol than normal.

The alcohol mixtures produced by the inventive process preferably contain no more than about 85% by weight methanol and can be directly added to gasoline. The portion of the alcohol product other than methanol is a mixture composed primarily of 2 to about 6 carbon atom alcohols. The distribution of $C_2$-$C_6$ alcohols on a methanol-free basis is preferably:

$C_2$—about 4 to about 25%
$C_3$—about 0.1 to about 25%, preferably about 9 to about 25%
$C_4$—about 0.5 to about 70%, preferably about 40 to about 70%
$C_5$—about 0.1 to about 12%
$C_6$—about 0.1 to about 10%.

The above-indicated percentages are by weight and based on the weight of the total amount of alcohols in the product having two or more carbon atoms. These alcohols are composed almost completely of isoalcohols and normal alcohols with the iso to normal ratio being in the range of about 0.01 to about 20. Preferably, substantially no tertiary alcohols are present.

The product alcohol mixtures of the present invention are useful in expanding gasoline. They can be mixed with gasoline in any amount, and when present in amounts of less than about 25% by weight of the gasoline/alcohol mixture, no significant effect on the operation of an internal combustion engine containing the gasoline/alcohol mixture is noticed. Furthermore, the mixed alcohol products of the present invention can be mixed with any type of gasoline be it substantially all paraffinic such as alkylate or highly aromatic. Moreover, if the product alcohol mixtures employed have no more than about 85% by weight methanol, the resultant gasoline/alcohol mixture can tolerate significant amounts of water without phase separation.

Alcohol mixtures produced in accordance with this invention containing more than about 85% methanol, for example up to about 92% methanol or more, can be used for addition with gasoline if such mixtures are blended with higher alcohols to provide a mixture with an overall methanol level of about 85% or less. These alcohol mixtures can be distilled to remove a sufficient amount of methanol to provide a mixture with a methanol level of about 85% or less.

In order to further illustrate the catalytic complex and process of the present invention, the following examples are provided. In the following examples as well as throughout the specification and claims, all parts and percentages are by weight and all temperatures are in degrees centigrade unless otherwise indicated.

EXAMPLE 1

97.47 parts of $Cu(NO_3)_2.3H_2O$, 51.86 parts $Zr(NO_3)_4.xH_2O$ (50% $ZrO_2$) and 78.09 parts aqueous $Mn(NO_3)_2$ (50.8% $Mn(NO_3)_2$) were added to two liters of water to form a mixture. The water had a temperature of 95° C. The pH of the mixture was raised to 9.5 by adding a 2M. $Na_2CO_3$ solution. The temperature of the $Na_2CO_3$ solution was 90° C. The mixture was cooled to room temperature, and the pH was then adjusted to 7.15 by adding a 2M. $HNO_3$ solution. The mixture was filtered. The filter cake was washed by slurrying in one liter of water at 60° C. and then filtering. This washing procedure was repeated two more times. The filter cake was dried at 140° C. for four hours, and then calcined in air at 400° C. for four hours to provide the desired product. The product had the nominal formula $Cu_{2.0}Zr_{1.0}Mn_{1.0}Na_{0.02-2.5}O_x$. The product had the following analysis: 32% Cu, 19.0% Zr, 14.0% Mn and 1.4% Na.

EXAMPLE 2

65.00 parts of $ZrO(NO_3)_2.xH_2O$ (0.5275 mole of Zr), 122.70 parts of $Cu(NO_3)_2.2.5H_2O$ (0.5275 mole of Cu) and 92.93 parts aqueous $Mn(NO_3)_2$ (0.2638 mole of Mn) were added to 2.5 liters of distilled water to form a mixture. The mixture was heated to 92° C. A 2M. $Na_2CO_3$ solution having a temperature of 90° C. was added to the mixture over a period of one hour until a pH of 9.50 was reached. The mixture was maintained at 92°-93° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. This washing procedure was repeated two more times. The filter cake was then dried overnight in an oven at 110° C., then calcined in air for four hours at 400° C. to provide the desired product. The product had the nominal formula $CU_{1.0}Zr_{1.0}Mn_{0.5}Na_{0.02-2.5}O_x$. The product had the following analysis: 34% Cu, 20.0% Zr, 15.0% Mn and 1.20% Na.

EXAMPLE 3

100.40 parts of $Cu(NO_3)_2.2.5H_2O$, 131.96 parts of $ZrO(NO_3)_2.xH_2O$, 76.02 parts of aqueous $Mn(NO_3)_2$ solution (50-52% by weight $Mn(NO_3)_2$), 345.41 parts of $Cr(NO_3)_3.9H_2O$ were added to 2.5 liters of distilled water and heated to 90° C. A 2M. $K_2CO_3$ solution having a temperature of 90° C. was added to the mixture over a period of 1.5 hours until a pH of 9.50 was reached. The mixture was maintained at a temperature of 90° C. for 45 minutes, then cooled to room temperature. The pH was adjusted to 7.00 by the addition of a 2M. $HNO_3$ solution. The mixture was vacuum filtered. The filter cake was washed by slurrying in two liters of water, heating to near boiling and then filtering. This washing cycle was repeated two more times. The filter cake was dried in an oven overnight at 110° C., then calcined in air at 400° C. to provide the desired product. The product had the nominal formula $CU_{1.0}Zr_{1.0}Mn_{0.5}Cr_{2.0}K_{0.02-2.5}O_x$. The product had the following analysis: 12% Cu, 22.0% Zr, 5.8% Mn, 20% Cr and 8.3% K.

EXAMPLE 4

50.20 parts of $Cu(NO_3)_2.2.5H_2O$ (0.2158 mole of Cu), 65.98 parts of $ZrO(NO_3)_2.xH_2O$ (0.2158 moles of Zr), 38.01 parts of aqueous $Mn(NO_3)_2$ (0.1079 mole of Mn) and 161.91 parts of $Al(NO_3)_3.9H_2O$ (0.4316 mole of Al) were added to 2.5 liters of distilled water and heated to 90°-93° C. An aqueous solution of $K_2CO_3$ at a temperature of 90° C. was added to the mixture over a one-hour period until a pH of 9.50 was obtained. The mixture was then maintained at a temperature of 90°-93° C. for one hour, then cooled to room temperature. The pH was adjusted to 7.00 by the addition of a dilute $HNO_3$ solution. The mixture was vacuum filtered. The filter cake was washed by slurrying with one liter of water and filtering. The washing cycle was repeated two more times. The filter cake was dried for two days at 110° C., then calcined in air at 400° C. for four hours to provide the desired product. The resulting product had the nominal formula of $Cu_{1.0}Zr_{1.0}Mn_{0.5}Al_{2.0}K_{0.02-2.5}O_x$. The product had the following analysis: 17% Cu, 23.0% Zr, 7.2% Mn, 14.0% Al and 3.9% K.

EXAMPLE 5

122.70 parts of $Cu(NO_3)_2 \cdot 2.5H_2O$ (0.5275 mole of Cu), 65.0 parts of $ZrO(NO_3)_2 \cdot xH_2O$ (0.5275 mole of Zr), and 92.93 parts of aqueous $Mn(NO_3)_2$ (0.2638 mole of Mn) were added to 2.5 liters of distilled water and heated to 90° C. An aqueous solution of 2M. $Rb_2CO_3$ at a temperature of 90° C. was added to the mixture until a pH of 9.50 was obtained. The mixture was then maintained at a temperature of 90° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for two days at 110° C., then calcined in air at 400° C. for four hours to provide the desired product. The resulting product had the nominal formula of $Cu_{1.0}Zr_{1.0}Mn_{0.5}Rb_{0.02-2.5}O_x$. The product had the following analysis: 33% Cu, 20% Zr, 14.0% Mn and 3.2% Rb.

EXAMPLE 6

125 parts of $Cu(NO_3)_2 \cdot 2.5H_2O$, 65 parts of $ZrO(NO_3)_2 \cdot xH_2O$ (40.3% $ZrO_2$), 38.01 parts of aqueous $Mn(NO_3)_2$ (50.8% $Mn(NO_3)_2$) and 40 parts of $Al(NO_3)_3 \cdot 9H_2O$ were added to 2.5 liters of distilled water and heated to 90° C. A 2M. $K_2CO_3$ solution at a temperature of 90° C. was added to the mixture until a pH of 9.50 was obtained. The mixture was then cooled to room temperature. The pH was adjusted to 7.00 by the addition of a 2M. $HNO_3$ solution. The mixture was vacuum filtered. The filter cake was washed by slurrying with one liter of water and filtering. The washing cycle was repeated two more times. The filter cake was dried for one day at 110° C., then calcined in air at 400° C. for 4.75 hours to provide the desired product. The resulting product had the nominal formula of $Cu_{1.0}Zr_{1.0}Mn_{0.5}Al_{0.2}K_{0.02-2.5}O_x$. The product had the following analysis: 32% Cu, 20.0% Zr, 14.0% Mn, 2.9% Al and 2.5% K.

EXAMPLE 7

125 parts of $Cu(NO_3)_2 \cdot 2.5H_2O$, 166 parts of $ZrO(NO_3)_2 \cdot xH_2O$ (40.3% $ZrO_2$), and 93 parts of aqueous $Mn(NO_3)_2$ (50.0% $Mn(NO_3)_2$) were added to two liters of distilled water and heated to 90° C. An aqueous solution of 2M. $K_2CO_3$ at a temperature of 90° C. was added to the mixture until a pH of 9.50 was obtained. The mixture was then maintained at a temperature of 90° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for one day at 125° C., then calcined in air at 400° C. for four hours to provide the desired product. The resulting product had the nominal formula of $Cu_{1.0}Zr_{1.0}Mn_{0.5}K_{0.02-2.5}O_x$. The product had the following analysis: 23% Cu, 38.0% Zr, 8.0% Mn and 5.6% K.

EXAMPLE 8

62 parts of $Cu(NO_3)_2 \cdot 2.5H_2O$, 83 parts of $ZrO(NO_3)_2 \cdot xH_2O$, 46 parts of aqueous $Mn(NO_3)_2$ (50% $Mn(NO_3)_2$) and 101 parts of $Al(NO_3)_3 \cdot 9H_2O$ were added to two liters of distilled water and heated to 90° C. An aqueous solution of 2M. $K_2CO_3$ at a temperature of 90° C. was added to the mixture over a one-hour period until a pH of 9.50 was obtained. The mixture was then maintained at a temperature of 90° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for one day at 125° C., then calcined in air at 400° C. for four hours to provide the desired product. The resulting product had the nominal formula of $Cu_{1.0}Zr_{1.0}Mn_{0.5}Al_{1.0}K_{0.02-2.5}O_x$. The product had the following analysis: 19% Cu, 29.0% Zr, 6.6% Mn, 7.4% Al and 4.8% K.

EXAMPLE 9

125 parts of $Cu(NO_3)_2 \cdot 2.5H_2O$, 166 parts of $ZrO(NO_3)_2 \cdot xH_2O$, 93 parts of aqueous $Mn(NO_3)_2$ (50% $Mn(NO_3)_2$) and 14 parts of $Pd(NO_3)_2 \cdot xH_2O$ were added to two liters of distilled water and heated to 90° C. A 2M. $K_2CO_3$ solution at a temperature of 90° C. was added to the mixture over a one-hour period until a pH of 9.50 was obtained. The mixture was then maintained at a temperature of 90°–92° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for one day at 125° C., then calcined in air at 400° C. for four hours to provide the desired product. The resulting product had the nominal formula of $Cu_{1.0}Zr_{1.0}Mn_{0.5}Pd_{0.1}K_{0.02-2.5}O_x$. The product had the following analysis: 24% Cu, 41.0% Zr, 8.5% Mn, 4.3% Pd and 6.6% K.

EXAMPLE 10

62 parts of $Cu(NO_3)_2 \cdot 2.5H_2O$, 83 parts of $ZrO(NO_3)_2 \cdot xH_2O$, 46 parts of aqueous $Mn(NO_3)_2$ (50% $Mn(NO_3)_2$) and 1.87 parts of $H_2PtCl_6 \cdot H_2O$ were added to two liters of distilled water and heated to 90° C. A 2M. $K_2CO_3$ solution at a temperature of 90° C. was added to the mixture over a one-hour period until a pH of 9.50 was obtained. The mixture was then maintained at a temperature of 90°–93° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for two days at 125° C., then calcined in air at 400° C. for four hours to provide the desired product. The resulting product had the nominal formula of $Cu_{1.0}Zr_{1.0}Mn_{0.5}Pt_{0.02}K_{0.02-2.5}O_x$. The product had the following analysis: 24% Cu, 39.0% Zr, 8.6% Mn, 1.4% Pt and 3.2% K.

EXAMPLE 11

125 parts of $Cu(NO_3)_2 \cdot 2.5H_2O$, 166 parts of $ZrO(NO_3)_2 \cdot xH_2O$, 65.65 parts of aqueous $Mn(NO_3)_2 \cdot 4H_2O$ and 9.1 parts of $AgNO_3$ were added to two liters of distilled water and heated to 90° C. A 2M. $K_2CO_3$ solution at a temperature of 90° C. was added to the mixture over a one-hour period until a pH of 9.50 was obtained. The mixture was then maintained at a temperature of 90°–95° C. for one hour, then cooled to room temperature. The pH was adjusted to 7.00 by the addition of a 2M. $HNO_3$ solution. The mixture was vacuum filtered.

The filter cake was washed by slurrying with one liter of water, heating to near boiling and filtering. The washing cycle was repeated two more times. The filter cake was dried for one day at 120° C., then calcined in air at 400° C. for four hours to provide the desired product. The resulting product had the nominal formula of $Cu_{1.0}Zr_{1.0}Mn_{0.5}Ag_{0.1}K_{0.02-2.5}O_x$. The product had the following analysis: 19% Cu, 37.0% Zr, 6.4% Mn, 18.0% Ag and 4.8% K.

EXAMPLE 12

125 parts of $Cu(NO_3)_2.2.5H_2O$, 166 parts of $ZrO(NO_3)_2.xH_2O$, 93 parts of aqueous $Mn(NO_3)_2$ (50% $Mn(NO_3)_2$), 14 parts of $Pd(NO_3)_2.xH_2O$ and 40 parts of $Al(NO_3)_3.9H_2O$ were added to two liters of distilled water and heated to 92° C. A 2M. $K_2CO_3$ solution at a temperature of 90° C. was added to the mixture over a 1.75-hour period until a pH of 9.50 was obtained. The mixture was maintained at a temperature of 92° C. for one hour, then cooled to room temperature. The pH was adjusted to 7.00 by the addition of 2M. $HNO_3$ solution. The mixture was vacuum filtered. The filter cake was washed by slurrying with one liter of water, heating to near boiling and filtering. The washing cycle was repeated two more times. The filter cake was dried for one day at 110° C., then calcined in air at 400° C. for four hours to provide the desired product. The resulting product had the nominal formula of $Cu_{1.0}Zr_{1.0}Mn_{0.5}Pd_{0.1}Al_{0.2}K_{0.02-2.5}O_x$.

EXAMPLE 13

125 parts of $Cu(NO_3)_2.2.5H_2O$, 166 parts of $ZrO(NO_3)_2.xH_2O$, and 93 parts of aqueous $Mn(NO_3)_2$ (50% $Mn(NO_3)_2$) were added to two liters of distilled water and heated to 95° C. An aqueous slurry of $LiCO_3$ was added to the mixture over an eight-hour period until a pH of 8.80 was obtained. The mixture was then maintained at a temperature of 95° C. for 1.5-hours, then cooled to room temperature. The pH was adjusted to 7.00 by the addition of 190 ml. of 2M. $HNO_3$ solution. The mixture was vacuum filtered. The filter cake was washed by slurrying with one liter of water, heating to near boiling and filtering. The washing cycle was repeated two more times. The filter cake was dried for two days at 110° C., then calcined in air at 400° C. for four hours to provide the desired product. The resulting product had the nominal formula of $Cu_{1.0}Zr_{1.0}Mn_{0.5}Li_{0.02-2.5}O_x$. The product had the following analysis: 21% Cu, 35.0% Zr, 8.8% Mn and 2.1% Li.

EXAMPLE 14

62.5 parts of $Cu(NO_3)_2.2.5H_2O$, 166.0 parts of $ZrO(NO_3)_2.xH_2O$, and 93 parts of aqueous $Mn(NO_3)_2$ (50% $Mn(NO_3)_2$) were added to two liters of distilled water and heated to 95° C. A 2M. $Na_2CO_3$ solution at a temperature of 90° C. was added to the mixture over a one-hour period until a pH of 9.50 was obtained. The mixture was then maintained at a temperature of 95° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for one day at 110° C., then calcined in air at 400° C. for four hours to provide the desired product. The resulting product had the nominal formula of $Cu_{0.5}Zr_{1.0}Mn_{0.5}Na_{0.02-2.5}O_x$. The product had the following analysis: 13% Cu, 39.0% Zr, 11.0% Mn and 5.4% Na.

EXAMPLE 15

187.5 parts of $Cu(NO_3)_2.2.5H_2O$, 166 parts of $ZrO(NO_3)_2.xH_2O$, and 93 parts of aqueous $Mn(NO_3)_2$ (50% $Mn(NO_3)_2$) were added to two liters of distilled water and heated to 95° C. An aqueous solution of 2M. $Na_2CO_3$ at a temperature of 90° C. was added to the mixture over a one-hour period until a pH of 9.50 was obtained. The mixture was then maintained at a temperature of 95° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for two days at 110° C., then calcined in air at 400° C. for four hours to provide the desired product. The resulting product had the nominal formula of $Cu_{1.5}Zr_{1.0}Mn_{0.5}Na_{0.02-2.5}O_x$. The product had the following analysis: 29% Cu, 29.0% Zr, 8.5% Mn and 4.9% Na.

EXAMPLE 16

125 parts of $Cu(NO_3)_2.2.5H_2O$, 166 parts of $ZrO(NO_3)_2.xH_2O$, and 186 parts of aqueous $Mn(NO_3)_2$ (50% $Mn(NO_3)_2$) were added to two liters of distilled water and heated to 95° C. A 2M. $Na_2CO_3$ solution at a temperature of 90° C. was added to the mixture over a one-hour period until a pH of 9.50 was obtained. The mixture was then maintained at a temperature of 95° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for one day at 110° C., then calcined in air at 400° C. for four hours to provide the desired product. The resulting product had the nominal formula of $Cu_{1.0}Zr_{1.0}Mn_{1.0}Na_{0.02-2.5}O_x$. The product had the following analysis: 19% Cu, 29.0% Zr, 17.0% Mn and 5.0% Na.

EXAMPLE 17

87.5 parts of $Cu(NO_3)_2.2.5H_2O$, 116.2 parts of $ZrO(NO_3)_2.xH_2O$, and 195.3 parts of aqueous $Mn(NO_3)_2$ (50% $Mn(NO_3)_2$) were added to two liters of distilled water and heated to 95° C. A 2M. $Na_2CO_3$ solution at a temperature of 90° C. was added to the mixture over a one-hour period until a pH of 9.50 was obtained. The mixture was then maintained at a temperature of 95° C. for one hour, then cooled to room temperature. The pH was adjusted to 7.00 by the addition of a 2M. $HNO_3$ solution. The mixture was vacuum filtered. The filter cake was washed by slurrying with one liter of water, heating to near boiling and filtering. The washing cycle was repeated two more times. The filter cake was dried for one day at 110° C., then calcined in air at 400° C. for four hours to provide the desired product. The resulting product had the nominal formula of $Cu_{1.0}Zr_{1.0}Mn_{1.5}Na_{0.02-2.5}O_x$. The product had the following analysis: 17% Cu, 27.0% Zr, 23.0% Mn and 4.1% Na.

EXAMPLE 18

131.25 parts of $Cu(NO_3)_2.2.5H_2O$, 116.2 parts of $ZrO(NO_3)_2.xH_2O$, and 195.3 parts of aqueous $Mn(NO_3)_2$ (50% $Mn(NO_3)_2$) were added to two liters of distilled water and heated to 95° C. A 2M. Na$_2$CO$_3$ solution at a temperature of 90° C. was added to the mixture over a one-hour period until a pH of 9.50 was obtained. The mixture was then maintained at a temperature of 95° C. for one hour, then cooled to room temperature. The pH was adjusted to 7.00 by the addition of a 2M. HNO$_3$ solution. The mixture was vacuum filtered. The filter cake was washed by slurrying with one liter of water, heating to near boiling and filtering. The washing cycle was repeated two more times. The filter cake was dried for one day at 110° C., then calcined in air at 400° C. for four hours to provide the desired product. The resulting product had the nominal formula of Cu$_{1.5}$Zr$_{1.0}$Mn$_{1.5}$Na$_{0.02-2.5}$O$_x$. The product had the following analysis: 24% Cu, 23.0% Zr, 19.0% Mn and 3.2% Na.

EXAMPLE 19

122.70 parts of Cu(NO$_3$)$_2$.2.5H$_2$O (0.5275 mole of Cu), 65 parts of ZrO(NO$_3$)$_2$.xH$_2$O (0.5275 mole of Zr), and 92.93 parts of aqueous Mn(NO$_3$)$_2$ (0.2638 mole of Mn) were added to 2.5 liters of distilled water and heated to 90° C. 13.56 parts of Pd(NO$_3$)$_2$.xH$_2$O were added to the mixture. A 2M. Na$_2$CO$_3$ solution was added to the mixture over a one-hour period until a pH of 9.50 was obtained. The mixture was then maintained at a temperature of 90° C. for one hour, then cooled to room temperature. The pH was adjusted to 7.00 by the addition of a 2M. HNO$_3$ solution. The mixture was vacuum filtered. The filter cake was washed by slurrying with one liter of water at a temperature of 90° C. and filtering. The washing cycle was repeated two more times. The filter cake was dried for one day at 120° C., then calcined in air at 400° C. for four hours to provide the desired product. The resulting product had the nominal formula of Cu$_{1.0}$Zr$_{1.0}$Mn$_{0.5}$Pd$_{0.1}$Na$_{0.02-2.5}$O$_x$. The product had the following analysis: 34% Cu, 21.0% Zr, 15.0% Mn, 3.6% Pd and 1.7% Na.

EXAMPLE 20

125.0 parts of Cu(NO$_3$)$_2$.2.5H$_2$O, 166 parts of ZrO(NO$_3$)$_2$.xH$_2$O (42.15% ZrO$_2$), 93 parts of aqueous Mn(NO$_3$)$_2$ (50.8% Mn(NO$_3$)$_2$), 14.0 parts Pd(NO$_3$)$_2$.xH$_2$O (41.4% Pd) and 40 parts of Al(NO$_3$)$_3$.9H$_2$O were added to 2.5 liters of distilled water and heated to 90° C. A 2M. Na$_2$CO$_3$ solution at a temperature of 60°-70° C. was added dropwise to the mixture over a one-hour period until a pH of 9.50 was obtained. The mixture was vigorously stirred during the addition. The mixture was then maintained at a temperature of 90° C. for one hour, then cooled to room temperature. The pH was adjusted to 7.00 by the addition of a 2M. HNO$_3$ solution. The mixture was vacuum filtered. The filter cake was washed by slurrying with one liter of boiling distilled water and filtering. The washing cycle was repeated two more times. The filter cake was dried for one day at 110° C., then calcined in air at 400° C. for four hours to provide the desired product. The resulting product had the nominal formula of Cu$_{1.0}$Zr$_{1.0}$Mn$_{0.5}$Pd$_{0.1}$Al$_{0.2}$Na$_{0.02-2.5}$O$_x$. The product had the following analysis: 19% Cu, 31.0% Zr, 8.1% Mn, 1.4% Al, 3.5% Pd and 2.3% Na.

EXAMPLE 21

131.25 parts of Cu(NO$_3$)$_2$.2.5H$_2$O, 116.2 parts of ZrO(NO$_3$)$_2$.xH$_2$O and 195.3 parts of aqueous Mn(NO$_3$)$_2$ (50% Mn(NO$_3$)$_2$), were added to two liters of distilled water and heated to 95° C. A 2M. Na$_2$CO$_3$ solution at a temperature of 60°-70° C. was added dropwise to the mixture over a one-hour period until a pH of 9.50 was obtained. The mixture was then maintained at a temperature of 95° C. for one hour, then cooled to room temperature. The pH was adjusted to 7.00 by the addition of a 2M. HNO$_3$ solution. The mixture was vacuum filtered. The filter cake was washed by slurrying with one liter of distilled water, heating to near boiling and filtering. The washing cycle was repeated two more times. The filter cake was dried for one day at 110° C., then calcined in air at 400° C. for four hours to provide the desired product. The resulting product had the nominal formula of Cu$_{1.5}$Zr$_{1.0}$Mn$_{1.5}$Na$_{0.02-2.5}$O$_x$. The product had the following analysis: 24% Cu, 23% Zr, 19% Mn, and 3.2% Na.

EXAMPLE 22

87.5 parts of Cu(NO$_3$)$_2$.2.5H$_2$O, 116.2 parts of ZrO(NO$_3$)$_2$.xH$_2$O and 195.3 parts of aqueous Mn(NO$_3$)$_2$ (50% Mn(NO$_3$)$_2$) were added to two liters of distilled water and heated to 95° C. A 2M. Na$_2$CO$_3$ solution at a temperature of 60°-70° C. was added dropwise to the mixture over a one-hour period until a pH of 9.50 was obtained. The mixture was then maintained at a temperature of 95° C. for one hour, then cooled to room temperature. The pH was adjusted to 7.00 by the addition of a 2M. HNO$_3$ solution. The mixture was vacuum filtered. The filter cake was washed by slurrying with one liter of distilled water, heating to near boiling and filtering. The washing cycle was repeated two more times. The filter cake was dried for one day at 110° C., then calcined in air at 400° C. for four hours to provide the desired product. The resulting product had the nominal formula of Cu$_{1.0}$Zr$_{1.0}$Mn$_{1.5}$Na$_{0.02-2.5}$O$_x$. The product had the following analysis: 17% Cu, 27% Zr, 23% Mn, and 4.1% Na.

The alcohol synthesis process of the present invention is demonstrated by the examples discussed below and tabulated in Tables I-IV. In each of the examples A-M (Tables I-III), 20 cc. of catalysts prepared in accordance with the foregoing indicated examples were charged to a fixed bed reactor and contacted with an H$_2$/CO mixture having an H$_2$:CO ratio of 1. The processes were carried out at a pressure of 750 psig., a contact time of 32 seconds, and a space velocity was 3000 liters of gaseous reactant per liter of catalyst per hour. The temperatures for each process are indicated in the tables below. Prior to commencing the alcohol synthesis processes, each catalyst was ground to a 10-30 mesh size and reduced under an atmosphere of 15% H$_2$ and 85% N$_2$ by initially heating to 100° C., then heating over a 2-3 hour period to 150° C., then heating over a 1-2 hour period to 250° C. and maintaining a temperature of 250° C. for one hour. The reactor was then cooled to room temperature and pressurized to 750 psig with a 1:1 molar mixture of H$_2$/CO. The flow was adjusted to provide a space velocity of 3000 liters of gaseous reactant per liter of catalyst per hour. The reactor was then heated over a 1.5-hour period to the operating temperature. After about 1 to 1.5 hours of reaction, the off-gas (effluent) was sampled and analyzed and the condensible product diverted from a pre-run receiver to a product collection receiver. A recovery run proceeded for one to three hours during which time the off-gas was analyzed by gas chromatography and its volume measured. The liquid product was weighted and analyzed. In some instances, the catalyst was tested at more than one operating temperature. When this was done, the temperature of the reactor was changed over a 30-minute period and an equilibration period of 30–90 minutes was then allowed. The above-indicated procedures for the recovery run were then repeated. The results obtained are tabulated in the following Tables I–III.

TABLE I

| | Example | | | | |
|---|---|---|---|---|---|
| | A | B | C | D | E |
| Catalyst From Example No. | 5 | 6 | 9 | 9 | 9 |
| Temperature, °C. | 300 | 285 | 285 | 315 | 330 |
| Product gm/l/hr. | 98 | 221 | 190 | 91 | 100 |
| Higher Alcohols, gm/l/hr. | 22 | 32 | 36 | 32 | 39 |
| Higher Alcohols, Wt. % | 15.275 | 9.10 | 14.89 | 26.36 | 32.58 |
| Higher Alcohol/Hydrocarbon Wt. Ratio | 7.34 | 4.06 | 8.08 | 5.95 | 6.79 |
| $CH_4$, gm. | 0.041 | 0.099 | 0.180 | 0.081 | 0.096 |
| $CO_2$, gm. | 1.207 | 1.412 | 3.325 | 1.971 | 2.262 |
| Carbon Balance, % | 96.3 | 87.30 | 94.80 | 95.40 | 96.50 |
| Liquid Product, gms. | 1.97 | 4.42 | 7.60 | 1.83 | 2.00 |
| Liquid Analyses, Wt. % | | | | | |
| Methanol | 77.286 | 85.341 | 80.856 | 65.241 | 61.023 |
| Ethanol | 5.406 | 3.679 | 4.803 | 5.790 | 6.130 |
| Iso-$C_3OH$ | 0.000 | 0.000 | 0.867 | 0.778 | 0.847 |
| n-$C_3OH$ | 4.441 | 2.549 | 2.913 | 6.345 | 9.206 |
| Iso-$C_4OH$ | 1.692 | 0.986 | 0.467 | 0.811 | 1.360 |
| n-$C_4OH$ | 1.272 | 0.676 | 2.957 | 6.045 | 6.453 |
| Iso-$C_5OH$ | 1.249 | 0.532 | 1.512 | 4.556 | 6.052 |
| n-$C_5OH$ | 0.375 | 0.410 | 0.489 | 0.633 | 0.702 |
| Iso-$C_6OH$ | 0.522 | 0.266 | 0.445 | 0.811 | 1.126 |
| n-$C_6OH$ | 0.318 | 0.000 | 0.434 | 0.589 | 0.702 |

TABLE II

| | Example | | | |
|---|---|---|---|---|
| | F | G | H | I |
| Catalyst From Example No. | 9 | 10 | 12 | 12 |
| Temperature, °C. | 350 | 300 | 285 | 300 |
| Product gm/l/hr. | 78 | 147 | 233 | 207 |
| Higher Alcohols, gm/l/hr. | 36 | 25 | 38 | 47 |
| Higher Alcohols, Wt. % | 37.75 | 16.79 | 16.29 | 22.5 |
| Higher Alcohol/Hydrocarbon Wt. Ratio | 5.74 | 3.57 | 4.17 | 4.22 |
| $CH_4$, gm. | 0.102 | 0.277 | 0.363 | 0.443 |
| $CO_2$, gm. | 2.318 | 3.625 | 4.640 | 5.505 |
| Carbon Balance, % | 93.70 | 99.90 | 102.16 | 99.68 |
| Liquid Product, gms. | 1.55 | 5.88 | 9.30 | 8.29 |
| Liquid Analyses, Wt. % | | | | |
| Methanol | 53.692 | 79.431 | 78.528 | 74.508 |
| Ethanol | 5.622 | 3.904 | 5.262 | 5.727 |
| Iso-$C_3OH$ | 0.795 | 0.395 | 1.084 | 1.163 |
| n-$C_3OH$ | 12.900 | 4.976 | 4.000 | 6.286 |
| Iso-$C_4OH$ | 2.531 | 2.742 | 0.793 | 1.577 |
| n-$C_4OH$ | 5.801 | 1.343 | 2.386 | 3.199 |
| Iso-$C_5OH$ | 7.021 | 1.659 | 1.586 | 2.830 |
| n-$C_5OH$ | 0.817 | 0.835 | 0.603 | 0.817 |
| Iso-$C_6OH$ | 1.411 | 0.936 | 0.592 | 0.951 |
| n-$C_6OH$ | 0.851 | 0.000 | 0.000 | 0.000 |

TABLE III

| | Example | | | |
|---|---|---|---|---|
| | J | K | L | M |
| Catalyst From Example No. | 13 | 19 | 20 | 20 |
| Temperature, °C. | 285 | 300 | 285 | 300 |
| Product gm/l/hr. | 222 | 184 | 216 | 171 |
| Higher Alcohols, gm/l/hr. | 10 | 26 | 36 | 37 |
| Higher Alcohols, Wt. % | 4.382 | 13.74 | 16.88 | 21.53 |
| Higher Alcohol/Hydrocarbon Wt. Ratio | — | 3.92 | 3.97 | 2.87 |
| $CH_4$, gm. | 0.000 | 0.258 | 0.367 | 0.515 |
| $CO_2$, gm. | 2.241 | 3.948 | 4.538 | 5.827 |
| Carbon Balance, % | 100.2 | 100.50 | 104.60 | 99.59 |
| Liquid Product, gms. | 8.87 | 7.37 | 8.63 | 6.86 |
| Liquid Analyses, Wt. % | | | | |
| Methanol | 84.064 | 85.798 | 80.508 | 75.231 |
| Ethanol | 1.490 | 3.609 | 5.665 | 5.736 |
| Iso-$C_3OH$ | 0.000 | 0.000 | 0.851 | 0.824 |
| n-$C_3OH$ | 0.979 | 3.866 | 4.266 | 5.724 |
| Iso-$C_4OH$ | 1.079 | 3.541 | 1.030 | 1.604 |
| n-$C_4OH$ | 0.178 | 0.650 | 2.418 | 3.018 |
| Iso-$C_5OH$ | 0.289 | 1.042 | 1.478 | 2.339 |
| n-$C_5OH$ | 0.200 | 0.493 | 0.638 | 0.791 |
| Iso-$C_6OH$ | 0.167 | 0.538 | 0.537 | 0.813 |
| n-$C_6OH$ | 0.000 | 0.000 | 0.000 | 0.679 |

In each of the Examples N-S (Table IV), the procedure used for Examples A-M (Tables I–III) were used with the exception that the process was carried out at a pressure of 1000 psig, a contact time of approximately 50 seconds (see Table IV for exact contact times), and a space velocity of 2400 liters of gaseous reactant per liter of catalyst per hour.

TABLE IV

| | Example | | | | | |
|---|---|---|---|---|---|---|
| | N | O | P | Q | R | S |
| Catalyst From Example No. | 21 | 21 | 21 | 22 | 22 | 22 |
| Temperature, °C. | 285 | 300 | 325 | 285 | 300 | 325 |
| Product gm/l/hr. | 315 | 224 | 81 | 193 | 105 | 20 |
| Higher Alcohols, gm/l/hr. | 19 | 15 | 8 | 13 | 5 | 2 |
| Higher Alcohols, Wt. % | 6.042 | 6.609 | 9.902 | 6.660 | 5.166 | 12.410 |
| Higher Alcohol/Hydrocarbon Wt. Ratio | 6.20 | — | 0.786 | — | 0.940 | 0.190 |
| $CH_4$, gm. | 0.123 | 0.000 | 0.408 | 0.000 | 0.232 | 0.510 |
| $CO_2$, gm. | 1.250 | 2.376 | 3.953 | 1.537 | 2.394 | 4.045 |
| Carbon Balance, % | 99.40 | 100.93 | 100.12 | 95.80 | 90.30 | 98.60 |
| Liquid Product, gms. | 12.62 | 8.96 | 3.24 | 7.72 | 4.21 | 0.79 |
| Contact Time, sec. | 54.0 | 52.0 | 50.0 | 53.2 | 52.4 | 50.2 |
| Liquid Analyses, Wt. % | | | | | | |
| Methanol | 92.862 | 91.543 | 88.040 | 81.822 | 87.063 | 86.040 |
| Ethanol | 2.193 | 2.415 | 2.548 | 2.695 | 2.460 | 4.400 |
| Iso-$C_3OH$ | 0.00 | 0.00 | 0.00 | 0.00 | 0.00 | 0.32 |

TABLE IV-continued

| | Example | | | | | |
|---|---|---|---|---|---|---|
| | N | O | P | Q | R | S |
| n-$C_3$OH | 1.410 | 1.691 | 2.759 | 1.738 | 1.442 | 3.230 |
| Iso-$C_4$OH | 1.029 | 1.146 | 2.748 | 1.036 | 0.693 | 1.990 |
| n-$C_4$OH | 0.291 | 0.345 | 0.434 | 0.423 | 0.347 | 0.810 |
| Iso-$C_5$OH | 0.403 | 0.423 | 0.701 | 0.334 | 0.224 | 0.680 |
| n-$C_5$OH | 0.291 | 0.300 | 0.345 | 0.267 | 0.000 | 0.500 |
| Iso-$C_6$OH | 0.280 | 0.289 | 0.367 | 0.167 | 0.000 | 0.330 |
| n-$C_6$OH | 0.145 | 0.000 | 0.000 | 0.000 | 0.000 | 0.150 |

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A process for producing a product comprising an alcohol mixture, said process comprising contacting a gaseous reactant containing carbon monoxide and hydrogen at a pressure in the range of about 150 to about 2000 psig with a catalytic complex of the formula $$Cu_a Zr Mn_b Y_c A_d O_x$$

wherein

Y is selected from the group consisting of Ce, Cr, Co, Pd, Pt, Rh, Ag, Ru, Re, Os, Ta, Nb or a mixture of two or more thereof, A is an alkali or alkaline earth metal or a mixture of alkali and/or alkaline earth metals, a is from about 0.1 to about 3, b is from about 0.01 to about 3, c is from about 0.01 to about 3, d is from about 0.02 to about 2.5, and x is the number of oxygens needed to fulfill the valence requirements of the other elements.

2. The process of claim 1 wherein the mole ratio of hydrogen to carbon monoxide in said gaseous reactant is from about 1:10 to about 10:1.

3. The process of claim 2 wherein said ratio is about 1:3 to about 3:1.

4. The process of claim 1 wherein said gaseous reactant is synthesis gas.

5. The process of claim 1 wherein said gaseous reactant is at a pressure of about 150 to about 1500 psig.

6. The process of claim 1 wherein said gaseous reactant is at a temperature of about 100° C. to about 500° C.

7. The process of claim 1 wherein said catalyst is in a fixed bed reactor, fluidized bed reactor or a slurry reactor.

8. The process of claim 1 wherein the space velocity for said gaseous reactant is from about 1000 to about 100,000 liters of gaseous reactant per liter of catalyst per hour.

9. The process of claim 1 wherein said product comprises no more than about 85% by weight methanol.

10. The process of claim 1 wherein said product comprises a mixture of higher alcohols, the distribution of said higher alcohols on a methanol-free basis being $C_2$—about 4 to about 25 weight %

$C_3$—about 0.1 to about 25 weight %

$C_4$—about 0.5 to about 70 weight %

$C_5$—about 0.1 to about 12 weight %, and $C_6$—about 0.1 to about 10 weight %.

11. The process of claim 10 wherein $C_3$ alcohols are present in the amount of about 9 to about 25 weight percent and $C_4$ alcohols are present in the amount of about 40 to about 70 weight percent.

12. The process of claim 1 wherein Y is Ce, Pd, Pt, Cr or a mixture of two or more thereof.

13. The process of claim 1 wherein A is Na, Li, K, Rb, Cs, Be, Mg, Ca, Sr, Ba or a mixture of two or more thereof.

14. The process of claim 1 wherein A is Na, Li, K, Rb, Cs, Mg or a mixture of two or more thereof.

15. The process of claim 1 wherein a is from about 0.3 to about 1.5.

16. The process of claim 1 wherein b is from about 0.2 to about 1.

17. The process of claim 1 wherein c is from about 0.01 to about 0.5.

18. The process of claim 1 wherein d is from about 0.1 to about 1.

* * * * *